US009251720B2

(12) United States Patent
Ozawa

(10) Patent No.: US 9,251,720 B2
(45) Date of Patent: Feb. 2, 2016

(54) TRUNK SKELETON OF HUMAN BODY DUMMY

(75) Inventor: Yoshihiro Ozawa, Tokyo (JP)

(73) Assignee: JASTI CO., LTD., Tokyo (JP)

( * ) Notice: Subject to any disclaimer, the term of this patent is extended or adjusted under 35 U.S.C. 154(b) by 380 days.

(21) Appl. No.: 13/821,054

(22) PCT Filed: Sep. 5, 2011

(86) PCT No.: PCT/JP2011/070186
§ 371 (c)(1),
(2), (4) Date: Apr. 11, 2013

(87) PCT Pub. No.: WO2012/033060
PCT Pub. Date: Mar. 15, 2012

(65) Prior Publication Data
US 2013/0213155 A1 Aug. 22, 2013

(30) Foreign Application Priority Data

Sep. 7, 2010 (JP) ................................. 2010-200023

(51) Int. Cl.
*G09B 23/00* (2006.01)
*G01L 5/00* (2006.01)
(Continued)

(52) U.S. Cl.
CPC .............. *G09B 23/00* (2013.01); *G01L 5/0052* (2013.01); *G01M 7/08* (2013.01); *G09B 23/32* (2013.01)

(58) Field of Classification Search
CPC ...................................................... G09B 23/00
USPC ........................................ 73/866.4; 434/274
See application file for complete search history.

(56) References Cited

U.S. PATENT DOCUMENTS 3,754,338 A * 8/1973 Culver ........................... 434/274
3,762,069 A * 10/1973 Culver ........................... 434/274
(Continued)

FOREIGN PATENT DOCUMENTS

| DE | 605 262 | 11/1934 |
| FR | 2 358 716 | 2/1978 |
| GB | 2 344 922 A | 6/2000 |
| JP | A-2005-227266 | 8/2005 |
| JP | A-2006-258752 | 9/2006 |

OTHER PUBLICATIONS

Cook, Orthopedic Manual Therapy: An Evidence-Based Approach, 2/E, http://wps.prenhall.com/wps/media/objects/11326/11598624/docs/Chapter_07_Thoracic_Anatomy_and_Biomechanics.pdf, 2012.*

(Continued)

*Primary Examiner* — Peter Macchiarolo
*Assistant Examiner* — Alexander Mercado
(74) *Attorney, Agent, or Firm* — Oliff PLC

(57) ABSTRACT

A trunk skeleton of a human body dummy includes a spine portion, the spine portion including a plurality of vertebra portions made of metal-based materials or synthetic resin-based materials, a plurality of intervertebral buffer portions disposed between the vertebra portions, the intervertebral buffer portions being made of synthetic resin-based materials, and a bone-coupling portion coupling the vertebra portions in a displaceable manner, the bone-coupling portion including a metal-based rod-shaped member; and a thorax portion, the thorax portion including a plurality of costa portions having first ends coupled to the respective vertebra portions of the spine portion, thus forming respective pairs for the vertebra portions, the costa portions being made of synthetic resin-based materials, and a sternum body coupled to second ends of the costa portions, the sternum body being made of a synthetic resin-based material.

7 Claims, 7 Drawing Sheets

(51) Int. Cl.
*G01M 7/08* (2006.01)
*G09B 23/32* (2006.01)

(56) References Cited

U.S. PATENT DOCUMENTS

| | | | |
|---|---|---|---|
| 3,762,070 A | 10/1973 | Culver | |
| 3,962,801 A | 6/1976 | Gonzalez | |
| 4,669,302 A * | 6/1987 | Wagner et al. | 73/172 |
| 4,701,132 A * | 10/1987 | Groesch et al. | 434/274 |
| 5,152,692 A * | 10/1992 | Richards | 434/274 |
| 6,206,703 B1 | 3/2001 | O'Bannon | |
| 2005/0154468 A1 * | 7/2005 | Rivin | 623/17.16 |

OTHER PUBLICATIONS

Apr. 3, 2014 extended European Search Report issued in European Patent Application No. 11823535.7.

International Search Report issued in International Patent Application No. PCT/JP2011/070186 dated Oct. 25, 2011.

International Preliminary Report on Patentability issued in International Application No. PCT/JP2011/070186 on Mar. 12, 2013 (with translation).

* cited by examiner

CROSS SECTION ALONG A-A'

CROSS SECTION ALONG B-B'

CROSS SECTION ALONG C-C'

CROSS SECTION ALONG D-D'

CROSS SECTION ALONG E-E' ced materials, and a bone-coupling portion coupling the vertebra portions in a displaceable manner, the bone-coupling portion including a metal-based rod-shaped member; and a thorax portion, the thorax portion including a plurality of costa portions having first ends coupled to the respective vertebra portions of the spine portion, thus forming respective pairs for the vertebra portions, the costa portions being made of synthetic resin-based materials, and a sternum body coupled to second ends of the costa portions, the sternum body being made of a synthetic resin-based material.

TRUNK SKELETON OF HUMAN BODY DUMMY

TECHNICAL FIELD

This invention relates to a trunk skeleton of a human body dummy, the trunk skeleton of the human body dummy having a structure showing physical properties that are very approximate to those of the spine portion and the thorax portion of a human body, the trunk skeleton of the human body dummy being for use in the predictive estimation of injury to human being.

BACKGROUND ART

In conventional crash tests of cars or the like, a crash test human body model (human body dummy) is used as a measurement tool for estimating injury to human being. For example, a human body dummy is taken on a car like human being, a crash test is performed, and the resulting data from the test is analyzed and used for improved car crash safety performance.

One known human body dummy is, for example, a newborn dummy disclosed in Unexamined Japanese Patent Application Publication No. JP 2006-258752 A. The newborn dummy includes, in a portion corresponding to the abdominal portion in the torso portion of the spine portion, an abdominal pressure sensor disposed apart from the torso portion. It is thus possible to measure a pressure applied to the inside of the abdominal portion during a crash or the like.

RELATED ART DOCUMENT

Patent Document

Patent document 1: Unexamined Japanese Patent Application Publication No. JP 2006-258752 A

SUMMARY OF THE INVENTION

Problems to be Solved By the Invention

Unfortunately, because the spine portion having a structure used in the above newborn dummy of the conventional technologies includes mere rod-shaped members, it is hard to say that the spine portion is approximate to the human body structure, and because the newborn dummy does not include a thorax portion that is coupled to the spine portion, it is difficult for the resulting data to correctly indicate injury to the thorax portion and the spine portion of the human body.

To solve the above problems in the conventional technologies, it is an object of this invention to provide a trunk skeleton of a human body dummy, the trunk skeleton of the human body dummy having a structure showing physical properties that are more approximate to those of the spine portion and the thorax portion of a human body, thus allowing for improved performance of the predictive estimation of injury.

Means for Solving Problem

To solve the above problems and achieve the object, a trunk skeleton of a human body dummy according to the present invention includes a spine portion, the spine portion including a plurality of vertebra portions made of metal-based materials or synthetic resin-based materials, a plurality of intervertebral buffer portions disposed between the vertebra portions, the intervertebral buffer portions being made of synthetic resin-based materials, and a bone-coupling portion coupling the vertebra portions in a displaceable manner, the bone-coupling portion including a metal-based rod-shaped member; and a thorax portion, the thorax portion including a plurality of costa portions having first ends coupled to the respective vertebra portions of the spine portion, thus forming respective pairs for the vertebra portions, the costa portions being made of synthetic resin-based materials, and a sternum body coupled to second ends of the costa portions, the sternum body being made of a synthetic resin-based material.

Each vertebra portion has, for example, a top view shape formed in a rectangular shape, and each costa portion has a top view shape formed in a curved shape.

Six vertebra portions are provided, for example.

The intervertebral buffer portions are configured to have elasticity that allows the vertebra portions to be displaced at least in a forward and backward direction of the human body.

The intervertebral buffer portions are configured, for example, to have elasticity different at least in the forward and backward directions of the human body to allow each vertebra portion to have different amounts of displacement in the forward and backward directions.

Preferably, between the vertebra portions, the intervertebral buffer portions are opposed across the center of the vertebra portions in the forward and backward direction of the human body, and each intervertebral buffer portion includes a plurality of block-shaped forward and backward displacement control portions that have a longitudinal direction in the left and right direction of the human body, and a plurality of spherically shaped left and right displacement suppression portions opposed across the center in the left and right direction of the human body.

The intervertebral buffer portions may be formed in a columnar shape or in a rectangular flat plate shape. If the intervertebral buffer portions are formed in a columnar shape, they may be formed such that they have a height between end faces and opposite heights across the center of the vertebra portions in the forward and backward direction of the human body is different from opposite heights across the center in the left and right direction of the human body.

Note that if the intervertebral buffer portions are formed in a mere columnar shape or rectangular flat plate shape, they are preferably formed such that, for example, the elastic modulus of regions corresponding across the center of the vertebra portions in the forward and backward direction of the human body is different from the elastic modulus of regions corresponding across the center of the vertebra portions in the left and right direction of the human body, One bone-coupling portion may be provided in the center of the vertebra portions, for example. Alternatively, a plurality of bone-coupling portions may be provided in positions near side end faces, the positions being symmetrical about the center of the vertebra portions.

Effects of the Invention

The present invention may provide a trunk skeleton of a human body dummy, the trunk skeleton of the human body dummy having a structure showing physical properties that are more approximate to those of the human body, thus allowing for improved performance of the predictive estimation of injury to human being. Therefore, various types of tests may be performed using a trunk skeleton of a human body dummy according to this invention to analyze and use the resulting test data, thus contributing to further improved safety.

BEST MODE FOR CARRYING OUT THE INVENTION

Figure 1:
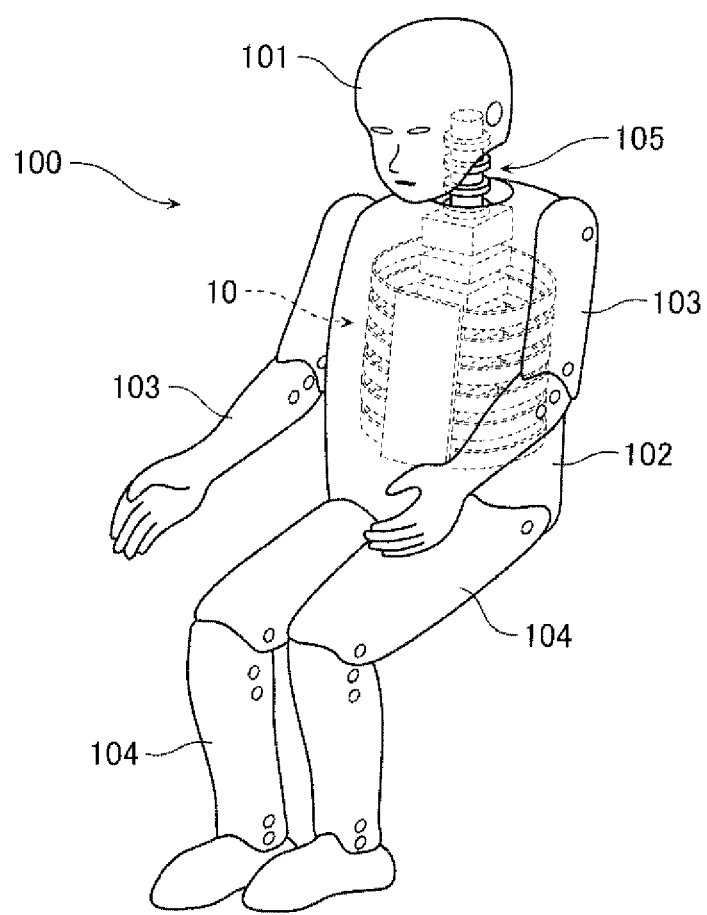
FIG. 1 is a total appearance perspective view showing a human body dummy including a trunk skeleton of a human body dummy according to a first embodiment of the present invention with the human body dummy being partially transparent.
Figure 2:
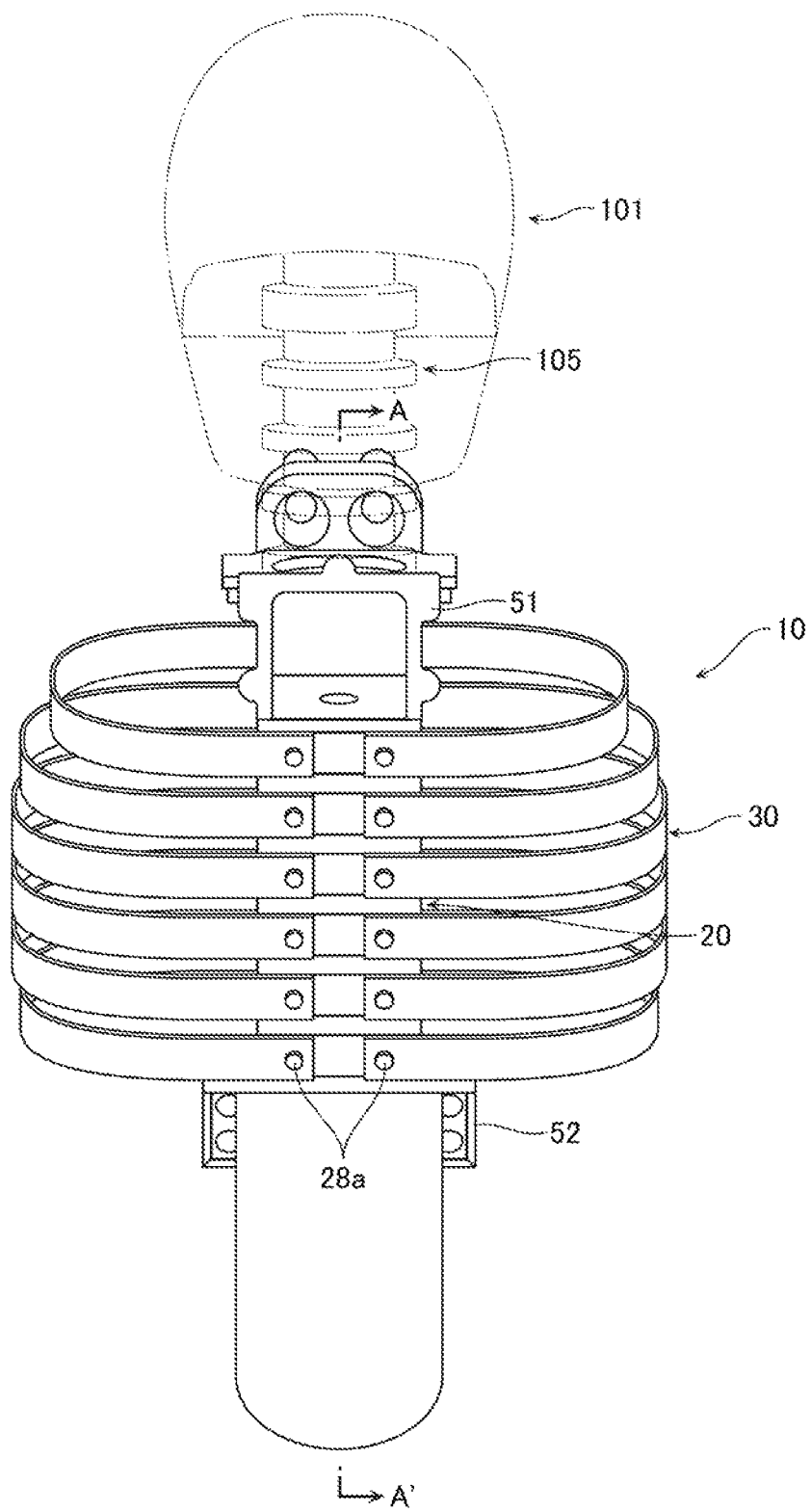
FIG. 2 is a rear view showing a structure of the trunk skeleton of the human body dummy.
Figure 3:
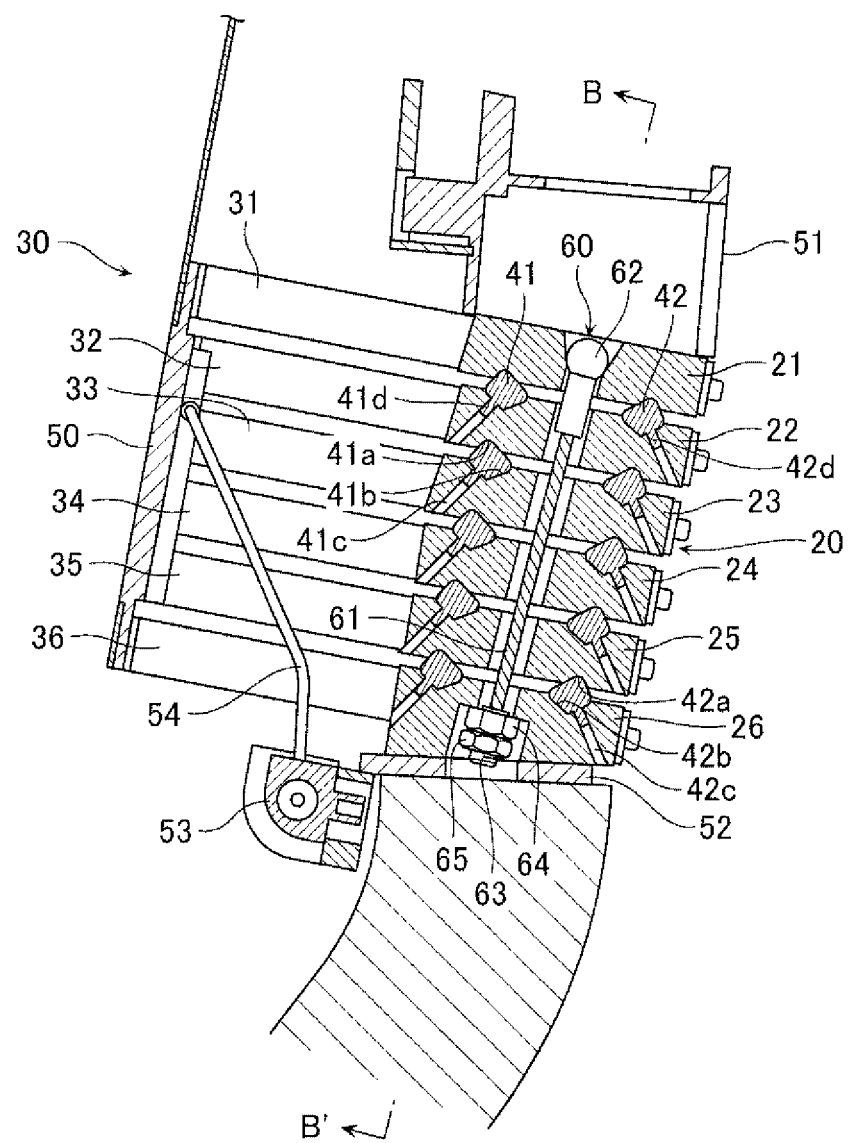
FIG. 3 is a cross-sectional view along the A-A' in FIG. 2.
Figure 4:
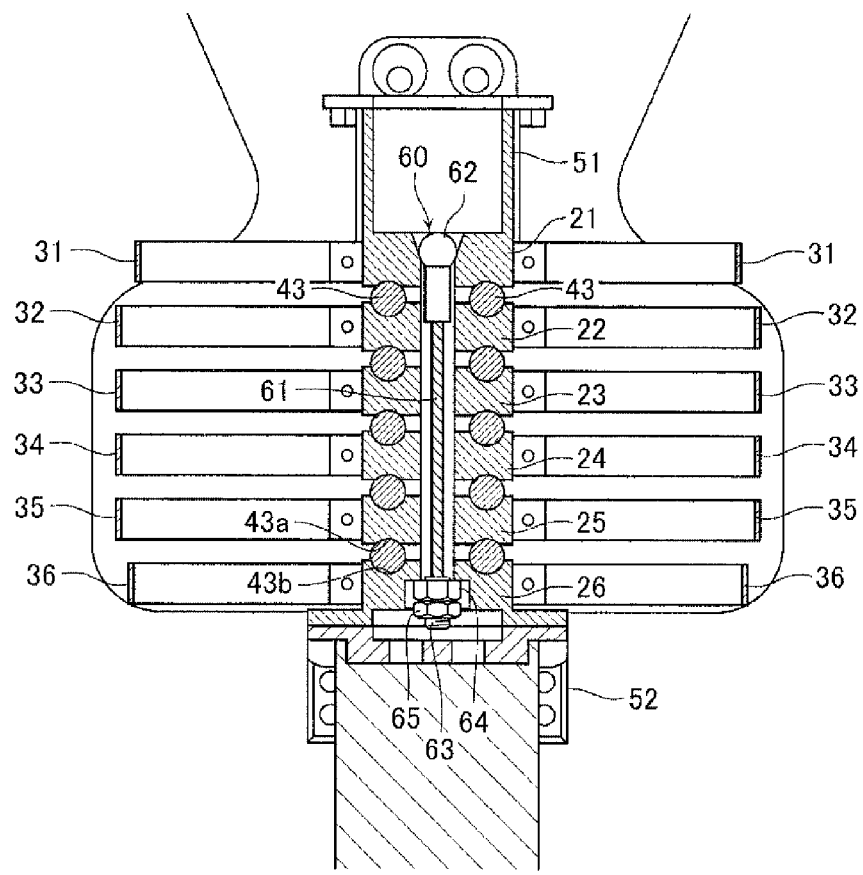
FIG. 4 is a cross-sectional view along the B-B' in FIG. 3.
Figure 5:
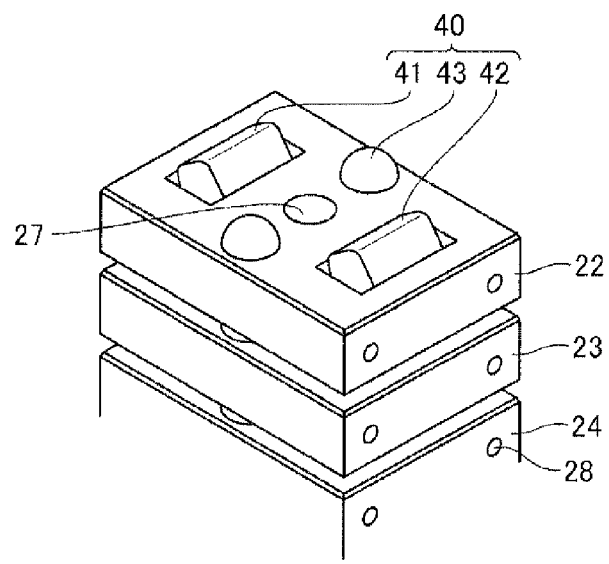
FIG. 5 is a perspective view showing a portion of a spine portion of the trunk skeleton of the human body dummy.

With reference to the accompanying drawings, embodiments of a trunk skeleton of a human body dummy according to this invention will be described in more detail below. FIG. 1 is a total appearance perspective view showing a human body dummy including a trunk skeleton of a human body dummy according to a first embodiment of the present invention with the human body dummy being partially transparent. FIG. 2 is a rear view showing a structure of the trunk skeleton of the human body dummy. FIG. 3 is a cross-sectional view along the A-A' in FIG. 2. FIG. 4 is a cross-sectional view along the B-B' in FIG. 3. FIG. 5 is a perspective view showing a portion of a spine portion of the trunk skeleton of the human body dummy.

With reference to FIG. 1, a human body dummy 100 is configured to include: a head portion 101 including a neck bone portion 105; a trunk portion 102 configured to include a breast portion on which the head portion 101 is mounted, a torso portion, and a lumbar portion; a pair of arm portions 103 attached to the trunk portion 102; and a pair of leg portions 104 attached to the trunk portion 102.

A trunk skeleton of a human body dummy (hereinafter, simply referred to as "a trunk skeleton portion") 10 according to the first embodiment is provided in the trunk portion 102 of the human body dummy 100 in a sitting or standing position. With reference to FIG. 2, the trunk skeleton portion 10 is configured to include a spine portion 20 that is approximate to the spine of the human body and a thorax portion 30 that is approximate to the thorax of the human body.

Note that the trunk skeleton portion 10 in this example forms a portion of the skeleton of the human body dummy 100 by, for example, connecting, on the upper side, an upper joint portion 51 of the spine portion 20 to the lower end portion of the neck bone portion 105, and on the lower side, a lower joint portion 52 of the spine portion 20 to the upper end portion of a not-shown lumbar bone portion. Such a configuration may allow easy replacement of a trunk skeleton portion attached to a conventional human body dummy with the trunk skeleton portion 10 according to the first embodiment.

With reference to FIGS. 3 to 5, the spine portion 20 of the trunk skeleton portion 10 is configured to include a plurality of vertebra portions 21, 22, 23, 24, 25, and 26, the vertebra portions being made of metal-based materials such as aluminum, stainless steel, and iron or high strength synthetic resin-based materials, a plurality of intervertebral buffer portions 40 disposed between the vertebra portions 21 to 26, the intervertebral buffer portions 40 being made of synthetic resin-based materials such as silicon rubber and butyl rubber, and a bone-coupling portion 60 coupling the vertebra portions 21 to 26 in a displaceable manner, the bone-coupling portion 60 including a metal wire made of a material such as stainless steel.

Meanwhile, the thorax portion 30 of the trunk skeleton portion 10 is configured to include a plurality of costa portions 31, 32, 33, 34, 35, and 36 having first ends coupled to the respective vertebra portions 21 to 26 of the spine portion 20, thus forming respective pairs for the vertebra portions 21 to 26, the costa portions 31, 32, 33, 34, 35, and being made of synthetic resin-based materials, and a sternum body 50 coupled to second ends of the costa portions to 36, the sternum body 50 being made of a synthetic resin-based material.

Each of the vertebra portions 21 to 26 of the spine portion 20 has a top view shape formed in a rectangular shape. Six vertebra portions are provided, for example, each having a center hole 27 formed in the central portion. The number of six is provided by the study of the applicant. The number means that all physical properties by the 12 thoracic spine configuration in the spine of the normal human body may be reproduced by a half number configuration.

Each pair of the costa portions 31 to 36 of the thorax portion 30 has a top view shape formed in a curved shape. The costa portions 31 to 36 have first ends coupled to respective coupling holes 28 provided on the rear end faces of the vertebra portions 21 to 26 via bolts 28a. The costa portions 31 to 36 have second ends coupled to respective coupling holes (not shown) of the sternum body 50 by means such as riveting.

The intervertebral buffer portions 40 of the spine portion 20 have elasticity that allows the vertebra portions 21 to 26 to be displaced at least in the forward and backward direction of the human body. The intervertebral buffer portions 40 are opposed across the respective centers of the vertebra portions 21 to 26 in the forward and backward direction of the human body. Each intervertebral buffer portion 40 includes a plurality of block-shaped forward and backward displacement control portions 41 and 42 that have a longitudinal direction in the left and right direction of the human body, and a plurality of spherically shaped left and right displacement suppression portions 43 and 43 opposed across the center in the left and right direction of the human body.

The forward and backward displacement control portions 41 and 42 may be configured to have different elasticity (for example, of Shore hardness A (Shore A) 40 to 90) to allow, for example, each of the vertebra portions 21 to 26 to have different amounts of displacement in the forward and backward directions of the human body. The forward and backward displacement control portions 41 and 42 are formed to have a vertical cross-sectional shape perpendicular to the longitudinal direction in a rounded corner trapezoidal shape. The left and right displacement suppression portions 43 suppress the vertebra portions 21 to 26 to cause them to have little displacement in the left and right directions. Each left and right displacement suppression portion 43 may be formed to provide a predetermined amount of displacement by changing an elastic coefficient.

For example, the forward and backward displacement control portions 41 and 42 maybe configured to allow the spine portion 20 to bend in the forward and backward direction of the human body at an angle of up to 7° between the vertebra portions 21 to 26, and the left and right displacement suppression portions 43 may be configured to allow the spine portion 20 to bend in the left and right direction of the human body at an angle of up to 9° between the vertebra portions 21 to 26. As described above, the elasticity of the intervertebral buffer portion 40 may be changed to control at least the bending of the spine portion 20 in the forward and backward direction.

Note that the intervertebral buffer portions 40 have a function and elasticity of controlling the vertebra portions 21 to 26 not to contact or interfere with each other when the spine portion 20 is displaced, and the intervertebral buffer portions 40 are engaged with respective fitting holes 41a, 41b, 42a, 42b, 43a, and 43b that are formed on the respective opposing faces of the vertebra portions 21 to 26.

More particularly, the forward and backward displacement control portions 41 and 42 are engaged with the fitting holes 41b and 42b, which are provided with insert holes 41c and 42c, respectively. The insert holes 41c and 42c are configured to receive insert pins 41d and 42d that are formed on the forward and backward displacement control portions 41 and 42 to prevent the forward and backward displacement control portions 41 and 42 from being detached from the fitting holes 41b and 42b when the spine portion 20 is displaced.

The bone-coupling portion 60 of the spine portion 20 is configured to include: a cable body 61 passing through the center holes 27 of the vertebra portions 21 to 26; a fixing ball 62 provided, for example, at a first end of the cable body 61; a sleeve 63 provided at a second end of the cable body 61; and a tightening nut 64 and a locking nut 65 attached to the sleeve 63.

The vertebra portions 21 to 26 are coupled in a displaceable manner by disposing each intervertebral buffer portion 40, providing the cable body 61 of the bone-coupling portion 60 through the center hole 27, attaching the tightening nut 64 on the sleeve 63 and tightening the tightening nut 64 by any torque, and locking the tightening nut 64 with the locking nut 65. The tightening torque of the bone-coupling portion 60 may be changed to arbitrarily set the displacement characteristic (bending property) of the spine portion 20.

Note that various sensors for measuring impact and pressure or the like may be installed in any location of the spine portion 20 and the thorax portion 30 and thus their detailed description is omitted here. The trunk skeleton portion 10 according to the first embodiment may have a structure in which, for example, the lower joint portion 52 is provided with a movement sensor 53 (see FIG. 3) that includes a probe 54 movably connected to the sternum body 50, thus allowing calculation of impact and pressure or the like applied on the thorax portion 30 during crash on the basis of data from the movement sensor 53.

The trunk skeleton portion 10 thus configured may show physical properties that are more approximate to those of the human body than the conventional trunk skeleton portions. A human body dummy mounted with the trunk skeleton portion 10 may be used to perform a test such as a crash test to dramatically improve the performance of the predictive estimation of injury to human being at the thorax or the spine, for example.

Further, the trunk skeleton portion 10 has a structure that may easily be replaced, and thus the trunk skeleton portion 10 may be applied to every sort of human body dummies such as those for adults, for women, and for babies. Thus, a human body dummy including the trunk skeleton portion 10 may be used to perform various types of tests to analyze and use the resulting test data, thus contributing to further improved safety.

Figure 6:
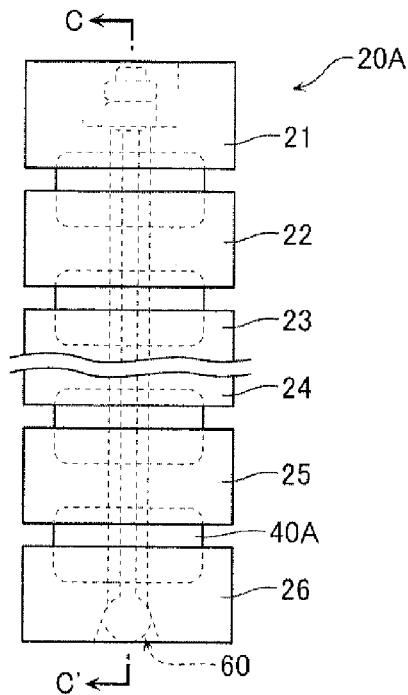
FIG. 6 is a side view of a spine portion of a trunk skeleton of a human body dummy according to a second embodiment of the present invention.
Figure 7:
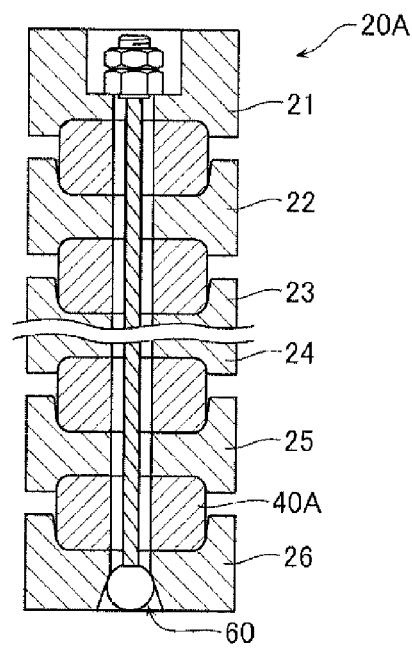
FIG. 7 is a cross-sectional view along the C-C' in FIG. 6.
Figure 8:
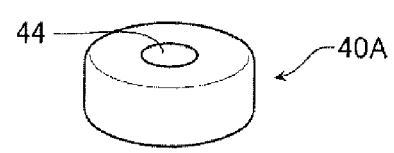
FIG. 8 is a perspective view showing an intervertebral buffer portion used in a spine portion of the trunk skeleton of the human body dummy.

FIG. 6 is a side view of a spine portion of a trunk skeleton of a human body dummy according to a second embodiment of the present invention. FIG. 7 is a cross-sectional view along the C-C' in FIG. 6. FIG. 8 is a perspective view showing an intervertebral buffer portion used in a spine portion of the trunk skeleton of the human body dummy. Note that in the following, elements overlapping the already described elements may be designated with like reference numerals and their detailed description may be omitted, and elements not very related to the present invention may not be clearly indicated.

With reference to FIGS. 6 to 8, a spine portion 20A of the trunk skeleton portion according to the second embodiment is similar to the spine portion 20 according to the first embodiment in that it includes the vertebra portions 21 to 26, the intervertebral buffer portions 40A, and the bone-coupling portion 60, and the spine portion 20A is different from the spine portion 20 in that it has a different shape and a different configuration of the intervertebral buffer portions 40A. That is, the intervertebral buffer portions 40A are formed in a columnar shape having a center hole 44 formed in the center thereof, and are disposed between the vertebra portions 21 to 26. The spine portion 20A thus configured may be used in the trunk skeleton portion 10 to allow the trunk skeleton portion 10 to be freely displaced in the forward and backward and the left and right directions of the human body.

Figure 9:
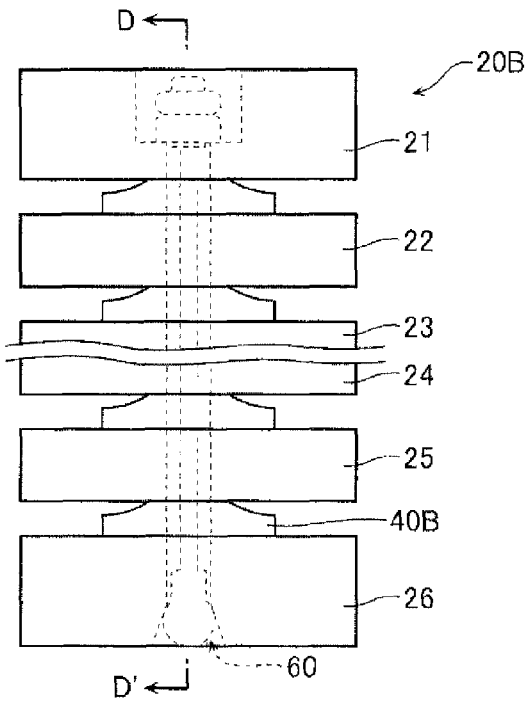
FIG. 9 is a side view showing a spine portion of a trunk skeleton of a human body dummy according to a third embodiment of the present invention.
Figure 10:
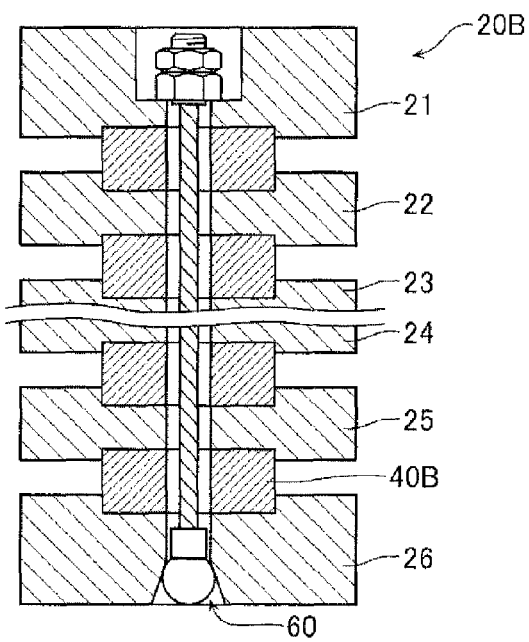
FIG. 10 is a cross-sectional view along the D-D' in FIG. 9.
Figure 11:
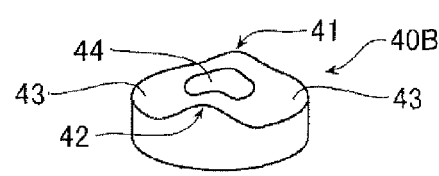
FIG. 11 is a perspective view of an intervertebral buffer portion used in a spine portion of the trunk skeleton of the human body dummy.

FIG. 9 is a side view showing a spine portion of a trunk skeleton of a human body dummy according to a third embodiment of the present invention. FIG. 10 is a cross-sectional view along the D-D' in FIG. 9. FIG. 11 is a perspective view showing an intervertebral buffer portion used in a spine portion of the trunk skeleton of the human body dummy.

With reference to FIGS. 9 to 11, a spine portion 20B of the trunk skeleton portion according to the third embodiment has intervertebral buffer portions 40B shaped differently from the intervertebral buffer portions 40A of the spine portion 20A according to the second embodiment. That is, the intervertebral buffer portion 40B is formed in a columnar shape that has a height between end faces, the opposite heights across the center hole 44 in the forward and backward direction of the human body being different from the opposite heights across the center hole 44 in the left and right direction of the human body. The intervertebral buffer portion 40B has a structure in which the higher regions correspond to the forward and backward displacement control portions 41 and 42 and the other regions correspond to the left and right displacement suppression portions 43. The spine portion 20B of such a structure may be used in the trunk skeleton portion 10 to provide a working effect similar to that in the trunk skeleton portion 10 according to the first embodiment.

Figure 12:
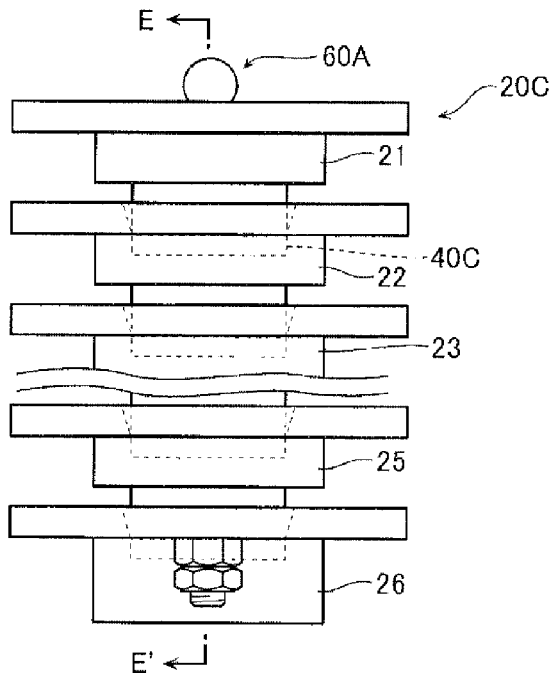
FIG. 12 is a side view showing a spine portion of a trunk skeleton of a human body dummy according to a fourth embodiment of the present invention.
Figure 13:
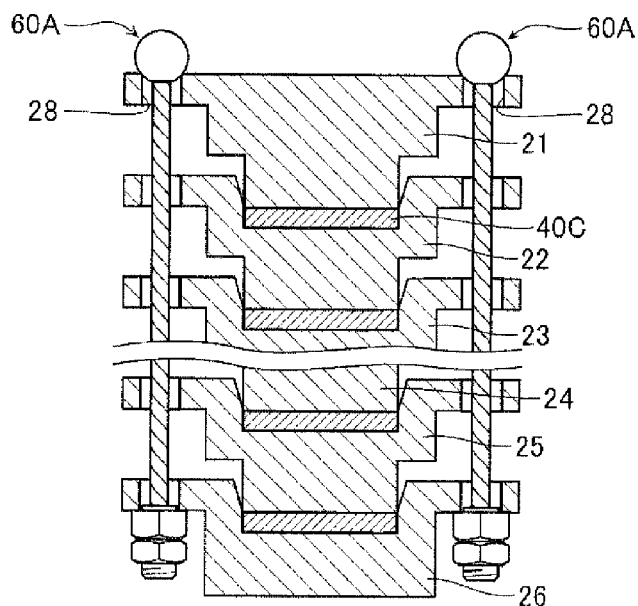
FIG. 13 is a cross-sectional view along the E-E' in FIG. 12.
Figure 14:
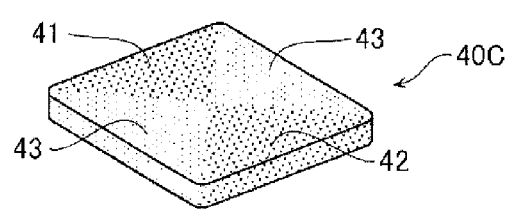
FIG. 14 is a perspective view showing an intervertebral buffer portion used in a spine portion of the trunk skeleton of the human body dummy.

FIG. 12 is a side view showing a spine portion of a trunk skeleton of a human body dummy according to a fourth embodiment of the present invention. FIG. 13 is a cross-sectional view along the E-E' in FIG. 12. FIG. 14 is a perspective view showing an intervertebral buffer portion used in the spine portion of the trunk skeleton of the human body dummy.

With reference to FIG, 12 to 14, a spine portion 200 of the trunk skeleton portion according to the fourth embodiment is different from the spine portion 20 of the trunk skeleton portion 10 according to the first embodiment as follows. The spine portion 200 includes a plurality of bone-coupling portions 60A that are provided in positions nearside end faces, the positions being symmetrical about the center of the vertebra portions 21 to 26. The spine portion 200 also includes intervertebral buffer portions 400 that are formed in a rectangular flat plate shape, and in which the elastic modulus of the regions corresponding across the center of the vertebra portions 21 to 26 in the forward and backward direction of the human body is different from the elastic modulus of the regions corresponding across the center of the vertebra portions 21 to 26 in the left and right direction of the human body.

That is, the bone-coupling portions 60A are provided passing through through-holes 28 and 28 that are provided in positions near the side end surfaces, the positions being symmetrical about the center of the vertebra portions 21 to 26. The intervertebral buffer portion 400 is formed such that, for example, regions delimited by the diagonals work as the forward and backward displacement control portions 41 and 42 and as the left and right displacement suppression portions 43. The spine portion 200 of such a structure may be used to provide a working effect similar to that in the trunk skeleton portion 10 according to the first embodiment.

DESCRIPTION OF REFERENCE NUMERALS 10 a trunk skeleton portion
20 a spine portion
21 to 26 vertebra portions
30 a thorax portion
31 to 36 costa portions
40 an intervertebral buffer portion
41,42a forward and backward displacement control portion
43 a left and right displacement suppression portion
50 a sternum body
51 an upper joint portion
52 a lower joint portion
53 a bone-coupling portion
100 a human body dummy

What is claimed is:

1. A trunk skeleton of a human body dummy comprising:
   a spine portion having a plurality of vertebra portions made of metal-based materials or synthetic resin-based materials, a plurality of intervertebral buffer portions disposed between the vertebra portions, the intervertebral buffer portions being made of synthetic resin-based materials, and a bone-coupling portion coupling the vertebra portions in a displaceable manner, the bone-coupling portion including a metal-based rod-shaped member; and
   a thorax portion having a plurality of costa portions having first ends coupled to the respective vertebra portions of the spine portion, thus forming respective pairs for the vertebra portions, the costa portions being made of synthetic resin-based materials, and a sternum body coupled to second ends of the costa portions, the sternum body being made of a synthetic resin-based material,
   wherein the intervertebral buffer portion are opposed across a center of the vertebra portions in a forward and backward direction of the human body, and each intervertebral buffer portion comprises a plurality of block-shaped forward and backward displacement control portions that have a longitudinal direction in a left and right direction of the human body, and a plurality of spherically shaped left and right displacement suppression portions opposed across the center in the left and right direction of the human body.

2. The trunk skeleton of the human body dummy according to claim 1, wherein
   each vertebra portion has a top view shape formed in a rectangular shape, and each costa portion has a top view shape formed in a curved shape.

3. The trunk skeleton of the human body dummy according to claim 1, wherein
   six vertebra portions are provided.

4. The trunk skeleton of the human body dummy according to claim 1, wherein
   the intervertebral buffer portions are configured to have elasticity that allows the vertebra portions to be displaced at least in the forward and backward direction of the human body.

5. The trunk skeleton of the human body dummy according to claim 1, wherein
   the intervertebral buffer portions are configured to have elasticity different at least in the forward and backward directions of the human body to allow each vertebra portion to have different amounts of displacement in the forward and backward directions.

6. The trunk skeleton of the human body dummy according to claim 1, wherein
   one bone-coupling portion is provided in the center of the vertebra portions.

7. The trunk skeleton of the human body dummy according to claim 1, wherein
   a plurality of bone-coupling portions are provided in positions near side end faces, the positions being symmetrical about the center of the vertebra portions.

* * * * *